(12) United States Patent
Haas et al.

(10) Patent No.: US 6,566,482 B2
(45) Date of Patent: May 20, 2003

(54) PROCESS FOR THE PREPARATION OF POLYURETHANE ELASTOMERS WITH A HIGH HEAT DISTORTION TEMPERATURE

(75) Inventors: Peter Haas, Haan (DE); Hans-Detlef Arntz, Lohmar (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 10/014,050

(22) Filed: Dec. 11, 2001

(65) Prior Publication Data

US 2002/0111453 A1 Aug. 15, 2002

(30) Foreign Application Priority Data

Dec. 14, 2000 (DE) .......................... 100 62 410

(51) Int. Cl.[7] .............................. C08G 18/10

(52) U.S. Cl. ................. 528/60; 528/65; 521/159

(58) Field of Search ............... 528/60, 65; 521/159

(56) References Cited

U.S. PATENT DOCUMENTS

| | | | | |
|---|---|---|---|---|
| 4,720,535 A | | 1/1988 | Schleier et al. | 528/59 |
| 4,808,690 A | | 2/1989 | Slagel | 528/60 |
| 5,227,451 A | * | 7/1993 | Tsuge et al. | |
| 5,672,635 A | | 9/1997 | Narayan et al. | 521/159 |
| 5,889,068 A | | 3/1999 | Madaj et al. | 521/137 |
| 5,990,258 A | | 11/1999 | Peter | 528/65 |
| 6,495,652 B1 | * | 12/2002 | Reichelt et al. | |

FOREIGN PATENT DOCUMENTS

EP 0 553 917 A2 8/1993

* cited by examiner

Primary Examiner—Rachel Gorr
(74) Attorney, Agent, or Firm—Joseph C. Gil; Lyndanne M. Whalen

(57) ABSTRACT

Polyurethane elastomers are produced by reacting a polyether and/or polyester polyol having a starter functionality of at least 2 with an NCO-terminated prepolymer produced with a polyether and/or polyester polyol having a starter functionality of at least 4. These polyurethane elastomers exhibit improved processing characteristics combined with a high heat distortion temperature.

11 Claims, No Drawings

PROCESS FOR THE PREPARATION OF POLYURETHANE ELASTOMERS WITH A HIGH HEAT DISTORTION TEMPERATURE

BACKGROUND OF THE INVENTION

The present invention relates to a process for the preparation of polyurethane elastomers with a high heat distortion temperature (HDT) and to elastomers produced by this process.

It is known that the polyurethane elastomers used for the production of polyurethane materials having a high heat distortion temperature are primarily those produced with aromatic amine chain extenders. Such polyurethane elastomers contain a certain proportion of urea segments to which the improved heat distortion temperature of the polyurethane elastomers is attributed. A disadvantage of using aromatic amines as chain extenders is their high reactivity which necessitates rapid processing in short reaction times of the polyurethane elastomer-forming materials. Moreover, the polyurethane elastomer-forming reaction mixture containing aromatic amine chain extenders does not exhibit satisfactory flow properties when being processed.

In contrast to the polyurethane elastomers made with aromatic amine chain extenders, glycol-crosslinked polyurethane elastomers have lower reactivity and improved flow properties. Unfortunately, however, the thermal stability of polyurethane materials produced with a glycol cross linking agent is lower than that of polyurethane elastomers made with an aromatic amine chain extender. In order to obtain an improved heat distortion temperature for the glycol-crosslinked polyurethane elastomers, it is necessary to condition the materials produced therefrom for a lengthy period of time.

SUMMARY OF THE INVENTION

The object of the present invention is to provide polyurethane elastomers which have a higher heat distortion temperature, require a short conditioning time and have good flow properties, i.e. which exhibit improved processing characteristics compared with known polyurethane elastomers, combined with a high heat distortion temperature of the polyurethane materials produced therefrom.

This and other objects which will be apparent to those skilled in the art are accomplished by producing a glycol-crosslinked polyurethane elastomer from a polyether or polyester polyol having a starter functionality of at least 2 and an NCO-terminated prepolymer which has been produced with a polyether or polyester polyol having a starter functionality of at least 4.

DETAILED DESCRIPTION OF THE INVENTION

The present invention provides a process for the preparation of polyurethane elastomers and elastomers produced by this process. In the process of the present invention, a) from about 25 to about 50 wt. % (based on total weight of elastomer), preferably from about 30 to about 40 wt. %, of a polyether and/or polyester polyol having a number average molecular weight of from about 500 to about 18,000 and a starter functionality of at least 2, b) from about 6 to about 14 wt. % (based on total weight of elastomer), preferably from about 8 to about 12 wt. %, of a glycolic chain extender having at least two hydroxyl groups per molecule and a molecular weight of from about 62 to about 499, and c) from about 0.05 to about 0.5 wt. % (based on total weight of elastomer), preferably from about 0.1 to about 0.4 wt. % of a catalyst are reacted with d) an NCO-terminated prepolymer having an NCO content of up to 28% which has been produced from a polyisocyanate of the MDI (diphenylmethane diisocyanate) or HMDI (hydrogenated diphenylmethane diisocyanate) series and a polyether and/or polyester polyol having a number average molecular weight of from about 500 to about 18,000 and a starter functionality of at least 4.

The amount of polyisocyanate used to produce the prepolymer is from about 40 to about 65 wt. % (based on total weight of elastomer), preferably from about 45 to about 60 wt. %.

The polyether and polyester polyols useful as component a) preferably have a number average molecular weight of from about 2000 to about 16,000 and a starter functionality from 3 to 6.

Such polyether and polyester polyols are known to those skilled in the art and are described in more detail, for example, in G. Oertel, *Kunststoffhandbuch*, Vol. 7, pages 57–75 (Carl Hanser Verlag, 3rd edition, Munich/Vienna 1993). Suitable polyether polyols may be produced in accordance with any of the known methods. In one of the commonly used methods, a starter compound is alkoxylated, preferably with ethylene and/or propylene being used as the alkoxylation agent. Starter compounds are preferably selected from hydroxyl group-containing compounds which will result in the desired functionality of the polyether polyol, namely a starter functionality at least 2 in the case of component a) and a functionality of at least 4 in the case of component d). Examples of suitable starter compounds include: sorbitol, sucrose, pentaerythritol, glycerol, trimethylolpropane, propylene glycol, ethylene glycol, butylene glycol and water. The amount of starter or starter mixtures (the addition of water) used is such that the described functionalities are obtained.

The polyester polyols useful in the practice of the present invention are likewise built up in a known manner such as by polycondensation of multifunctional carboxylic acids with corresponding hydroxyl compounds, by polycondensation of hydroxycarboxylic acids, by polymerization of cyclic esters (lactones), by polyaddition of carboxylic acid anhydrides with epoxides and by reaction of acid chlorides with alkali salts of hydroxyl compounds. The polyesters are preferably prepared by polycondensation of multifunctional carboxylic acids such as phthalic acid, isophthalic acid, terephthalic acid, fumaric acid, glutaric acid, adipic acid and succinic acid, with suitable hydroxyl compounds such as ethylene glycol, diethylene glycol, tetraethylene glycol, 1,2-propane diol; 1,4-butane diol; 1,6-hexane diol, glycerol and trimethylolpropane.

With regard to the structure of the polyester polyols, care should also be taken to ensure that the hydroxyl compounds used are those which result in a starter functionality of at least 2 for component a) and a starter functionality of at least 4 for component d).

Preferred glycolic chain extenders useful in the process of the present invention are those having from 2 to 6 hydroxyl groups per molecule and a molecular weight of from 62 to 499. Examples of such chain extenders include: ethylene glycol, butylene glycol, anhydrosorbitol, bis-(hydroxyethyl) hydroquinone, bis-(hydroxyethyl)-bisphenol A; preferably, ethylene glycol, 1,4-butane diol, 1,3-butane diol and 1,4-bis-(2-hydroxyethyl) hydroquinone. Mixtures of these chain extenders may, of course, also be used.

Suitable catalysts for the preparation of polyurethane elastomers in accordance with the present invention include any of the known catalysts and catalyst systems known to be useful in polyurethane chemistry. Such catalysts are described, for example, in the above-mentioned *Plastics Handbook*, Vol. 7 (Polyurethanes), pages 104 et seq., 3rd edition, Carl Hanser Verlag, Munich/Vienna 1993. Among the preferred catalysts are those based on tertiary amines such as diazabicyclo[2,2,2]octane, N-methylimidazole, dimethylamino-propylamine, 1,5-diazabicyclo[4,3,0]non-5-ene, and 1,8-diazabicyclo[5,4,0]undec-7-ene, and organo-metallic compounds such as dialkyltin alkylmercaptides, dialkyltin carboxylates, tin (II) carboxylates, zinc carboxylates, dialkoxytitanium carboxylates and titanium acetyl acetonate.

Suitable polyisocyanates of the MDI series which are useful as the basis of the above-mentioned NCO prepolymers include the known MDI isomers and the hydrogenation products thereof (HMDI) and polymeric MDI. 4,4'-MDI, 2,4'-MDI and 2,2'-MDI are preferred, particularly the 4,4'-MDI and 4,4'-diisocyanatodicyclohexylmethane isomers.

Of course, the polyisocyanate used may also be modified, for example, by biuret, allophanate or carbodiimide groups. The content of the modifying groups may be up to 30 wt. %, based on the isocyanate used.

In the process of the present invention, as mentioned above, the polyisocyanate is reacted in the form of its NCO prepolymer with the polyol(s) and chain extender(s) mentioned. The NCO prepolymer used in the practice of the present invention has an NCO content of at most 28%, preferably from 14% to 28%, most preferably from 16% to 26%.

It is, of course, possible to use auxiliaries and additives known in polyurethane chemistry in the practice of the present invention. Examples of such auxiliaries and additives include: surfactants, blowing agents, flame retardants, fillers, antioxidants, release agents, colorants, biocides and anti-static agents. The amount of such auxiliaries and additives used will depend on the intended application for the particular polyurethane elastomer being prepared and may be determined easily by appropriate preliminary tests. Such auxiliaries and additives are also mentioned and described in the above-mentioned *Plastics Handbook*.

The polyurethane elastomers of the present invention are useful in the manufacture of parts for automobiles and utility vehicles such as wings, vehicle roofs, engine bonnets, wind deflectors and door elements.

Having thus described our invention, the following Examples are given as being illustrative thereof.

EXAMPLES a) Polyols Used

Polyol 1

Polyether polyol having an OH value of 28 obtained by addition of propylene oxide and ethylene oxide (in a ratio of 80:20) to trimethylolpropane as starter with 90% primary OH groups. Starter functionality=3; number average molecular weight=6000.

Polyol 2

Polyether polyol having an OH value of 35 obtained by addition of propylene oxide and ethylene oxide (80:20) to pentaerythritol as starter with 90% primary OH groups. Starter functionality=4; number average molecular weight=6400.

Polyol 3

Polyether polyol having an OH value of 28 obtained by addition of propylene oxide and ethylene oxide (80:20) to sorbitol as starter with 90% primary OH groups. Starter functionality=6; number average molecular weight=12,000.

b) Prepolymers Used

Prepolymer 1

Prepolymer having an NCO content of 24% obtained by reacting a 23% carbodiimidized 4,4'-diisocyanatodiphenyl-methane that had a 29% NCO content with Polyol 1.

Prepolymer 2

Prepolymer having an NCO content of 24% obtained by reacting a 23% carbodiimidized 4,4'-diisocyanatodiphenyl-methane that had a 29% NCO content with Polyol 2.

Prepolymer 3

Prepolymer having an NCO content of 24% obtained by reacting a 23% carbodiimidized 4,4'-diisocyanatodiphenyl-methane that had a 29% NCO content with Polyol 3.

The Table below gives the formulation details in wt. %, based on the PU elastomer formed, and the heat distortion temperature of the PU elastomers obtained (HDT: heat distortion temperature, determined according to DIN 53 461).

TABLE

| Example | Comparison | 1 | 2 | 3 | 4 | 5 | 6 |
|---|---|---|---|---|---|---|---|
| Polyol 1 | 25.4 | 25.4 | — | — | 25.4 | — | — |
| Polyol 2 | — | — | 25.4 | — | — | 25.4 | — |
| Polyol 3 | — | — | — | 25.4 | — | — | 25.4 |
| EG[1] | 10 | 10 | 10 | 10 | 10 | 10 | 10 |
| Stabilizer B8411 (Goldschmidt) | 0.5 | 0.5 | 0.5 | 0.5 | 0.5 | 0.5 | 0.5 |
| DABCO 33LV[2] | 0.25 | 0.25 | 0.25 | 0.25 | 0.25 | 0.25 | 0.25 |
| DBTDL[3] | 0.05 | 0.05 | 0.05 | 0.05 | 0.05 | 0.05 | 0.05 |
| Prepolymer 1 | 63.8 | | | | | | |
| Prepolymer 2 | — | 63.8 | 63.8 | 63.8 | | | |
| Prepolymer 3 | — | — | — | — | 63.8 | 63.8 | 63.8 |
| HDT (° C.) (unconditioned) | 59 | 84 | 84 | 84 | 89 | 87 | 92 |
| HDT (° C.) after Conditioning (4 h 120° C.) | 90 | | 139 | | | | 140 |

[1]EG = ethylene glycol
[2]DABCO 33LV = catalyst commercially available from Air Products.
[3]DBTDL = dibutyl tin dilaurate The HDTs relate to a molded part (sheet) with the dimensions 200×200×2 mm which was produced at a molding temperature of 60° C. under conventional processing conditions by mixing the components under high pressure.

It can be seen from the Table that improved HDTs were obtained both in the conditioned and in the unconditioned state when polyols with a starter functionality of at least 4 were used to prepare the prepolymer and the polyol with which the prepolymer was reacted had a starter functionality of at least 2.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyurethane elastomer comprising reacting
   a) from about 25 to about 50 wt. %, based on total weight of elastomer, of a polyether and/or polyester polyol having a number average molecular weight of from 500 to 18,000 and a starter functionality of at least 2,
   b) from about 6 to about 14 wt. %, based on total weight of elastomer, of a glycolic chain extender having at least two hydroxyl groups per molecule and a molecular weight of from 62 to 499, and
   c) from about 0.05 to about 0.5 wt. %, based on total weight of elastomer, of a catalyst with
   d) an NCO-terminated prepolymer having an NCO content of up to 28% which is produced by reacting
      (1) from about 40 to about 65 wt. %, based on total weight of elastomer, of a diphenylmethane diisocyanate or a hydrogenated diphenylmethane diisocyanate and
      (2) a polyether and/or polyester polyol having a number average molecular weight of from 500 to 18,000 and a starter functionality of at least 4.

2. The process of claim 1 in which the polyether or polyester polyol used as component a) has a number average molecular weight of from 2000 to 16,000 and a starter functionality from 3 to 6.

3. The process claim 1 in which the polyether or polyester polyol used as component a) is used in an amount of from about 30 to about 40 wt. %.

4. The process of claim 3 in which the glycolic chain extender b) is used in an amount of from about 8 to about 12 wt. %.

5. The process of claim 4 in which the catalyst c) is used in an amount of from about 0.1 to about 0.4 wt. %.

6. The process of claim 5 in which the amount of isocyanate used to produce the NCO prepolymer used is from about 45 to about 60 wt. %.

7. The process of claim 1 in which the glycolic chain extender b) is used in an amount of from about 8 to about 12 wt. %.

8. The process of claim 1 in which the catalyst c) is used in an amount of from about 0.1 to about 0.4 wt. %.

9. The process of claim 1 in which the isocyanate used to produce NCO prepolymer is an amount of from about 45 to about 60 wt. %.

10. A polyurethane elastomer produced by the process of claim 1.

11. A polyurethane elastomer produced by the process of claim 6.

* * * * *